United States Patent [19]

Shimano

[11] Patent Number: 4,459,871

[45] Date of Patent: Jul. 17, 1984

[54] BRAKE OPERATING DEVICE FOR A BICYCLE INCLUDING A SUPPORTED COVER

[75] Inventor: Keizo Shimano, Sakai, Japan

[73] Assignee: Shimano Industrial Company Limited, Osaka, Japan

[21] Appl. No.: 296,172

[22] Filed: Aug. 25, 1981

[30] Foreign Application Priority Data

Sep. 10, 1980 [JP] Japan .................... 55-129534[U]

[51] Int. Cl.³ .................. G05G 11/00; B62K 23/06; B62L 3/02
[52] U.S. Cl. .................. 74/480 R; 74/489; 74/551.9
[58] Field of Search .................. 74/480 R, 489, 551.9

[56] References Cited

U.S. PATENT DOCUMENTS

| | | | |
|---|---|---|---|
| 3,776,061 | 12/1973 | Yoshigai | 74/480 R |
| 4,084,449 | 4/1978 | Kine | 74/489 X |
| 4,222,285 | 9/1980 | Kine | 74/480 R |

*Primary Examiner*—Allan D. Herrmann
*Attorney, Agent, or Firm*—Stevens, Davis, Miller & Mosher

[57] ABSTRACT

An operating device for a bicycle, which is mounted on a drop handlebar having a straight portion and bent portions and has a bracket member pivotally supporting a first lever extending along the bent portion and a second lever extending along the straight portion and connected with the first lever, the bracket member and the pivoted bases of the first and second levers being covered with a grip-like shaped cover, and supports each having a height larger than a thickness of the second lever and being disposed between the outer surface of the first side wall pivotally supporting the second lever and the inner surface of the cover opposite to the side wall and at both sides of said second lever in the swinging direction thereof.

9 Claims, 8 Drawing Figures

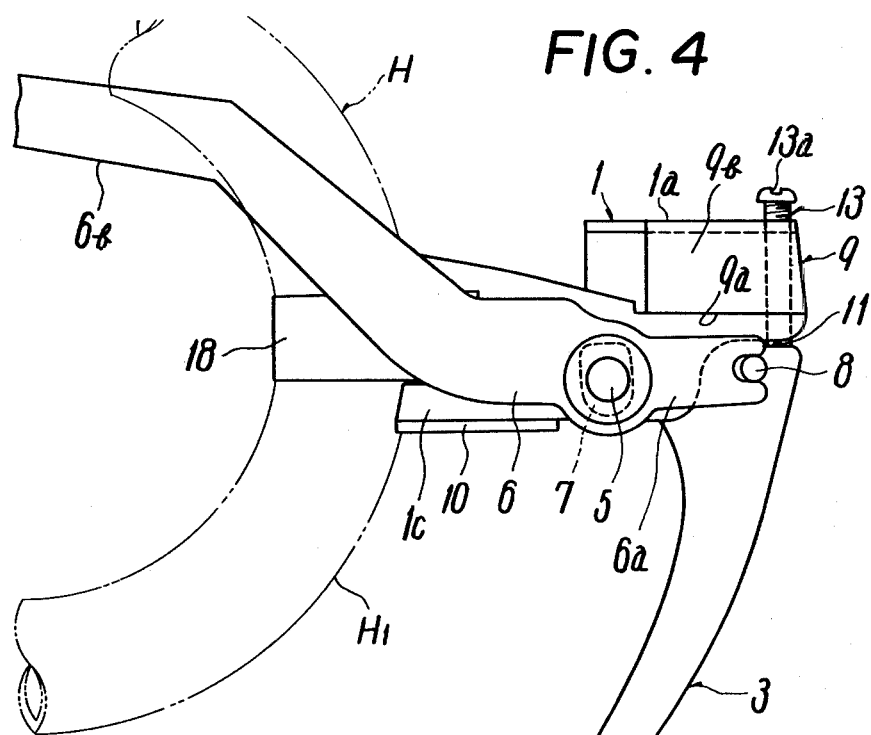
FIG. 4
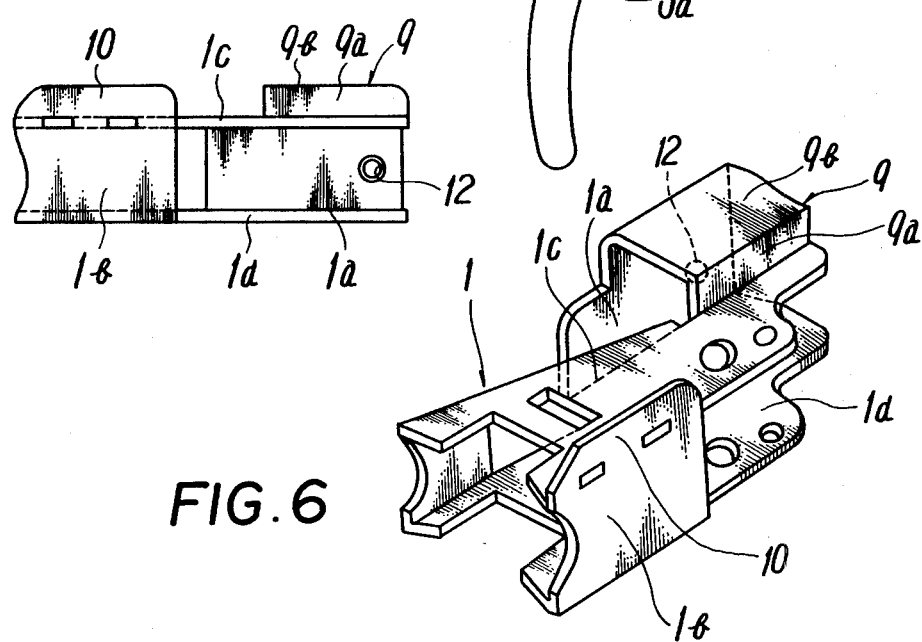
FIG. 5
FIG. 6

BRAKE OPERATING DEVICE FOR A BICYCLE INCLUDING A SUPPORTED COVER

FIELD OF THE INVENTION

This invention relates to an operating device for a bicycle, and more particularly to an operating device for a bicycle, which is mounted on a drop handlebar having a straight portion and bent portions and mainly used to operate the brake.

BACKGROUND OF THE INVENTION

This kind of operating device comprises a bracket member mounted on the bent portion of the drop handlebar a first lever extending along the bent portion of the drop handlebar, and a second lever extending along the straight portion and operable in association with the first lever, the first lever being operable by a cyclist's hand gripping the bent portion, the second lever being operable by his hand gripping the straight portion, so that a cyclist, while gripping the bracket member by his hand, can steer the bicycle and operate the first or second lever to produce a braking action.

Conventionally, the bracket member is covered by a soft grip cover so as to be soft to the touch.

The cover is sized to provide a good fit to the external form of the bracket member to thereby avoid its careless escape therefrom. The second lever is pivoted at the outside of the bracket member and the cover covers the second lever to the base thereof, so that the cyclist, when gripping the cover for steering the bicycle, press-contacts the cover at the inner surface thereof with the outer surface of the second lever.

In other words, the inwardly bent cover will provide a resistance to the swinging motion of the second lever, whereby a larger force is required by a cyclist to operate the second lever. Furthermore, with an inwardly bent cover, the second lever swings with respect to the cover to transmit its motion through the cover to a cyclist's hand gripping the cover, resulting in an unsmooth lever operation and an uncomfortable touch.

SUMMARY OF THE DISCLOSURE

In the light of the above problems, this invention has been designed. An object of the invention is to provide an operating device for a bicycle, which facilitates steering of the bicycle by a cyclist as he grips a cover covering a second lever to the pivoted base thereof, avoids the occurrence of resistance against the swinging motion of the second lever due to a press-contact of the cover therewith, thereby ensuring operation of the second lever with a light touch, and prevents the cover from the transmitting therethrough the second lever's motion to the cyclist's hand.

This invention is characterized in that in an operating device having a bracket member to which the first and second levers are pivoted and on which a cover is mounted to cover the pivoted base of each lever and the bracket member, first and second supports each having a height larger than a thickness of the second lever are provided between the outer surface of a first side wall of the bracket member at the second lever side and the inner surface of the cover opposite to the outer surface of the same and at both sides in the swinging direction of the second lever. The supports restrain the cover from deflecting, so that the cyclist, when gripping the cover for steering the bicycle, can avoid contact of the inner surface of the cover by his gripping of the second lever, thus adding no resistance against the swinging motion of the second lever.

This invention is advantageous in that the operating device, which has the cover covering the levers, especially the pivoted base of the second lever, has a neat appearance and enables the cyclist to steer the bicycle while gripping the cover with a comfortable touch and to always operate the lever with a light touch while gripping the cover, regardless of the intensity of his gripping force on the cover.

Four embodiments for the supports are proposed. First, the supports may be made integral with the bracket member, second, they may be made separate therefrom and made from, e.g., synthetic resin, to be fixed to the bracket member; third, the separate supports may be fixed to the cover, and fourth, the supports may be integral with the cover.

One of these support embodiments can be selected as desired, but the preferable embodiment is that which has the supports integral with the bracket member which is formed of a metallic plate as this is the simplest to produce and has a low production cost.

These and other objects of the invention will become more apparent in the detailed description and examples which follow.

BRIEF DESCRIPTION OF THE DRAWINGS

FIG. 4 is a rear view of the FIG. 1 embodiment, from which a cover is removed, FIG. 5 is a front view of a bracket member only, FIG. 6 is a perspective view thereof.

DETAILED DESCRIPTION OF THE INVENTION

Figure 1:
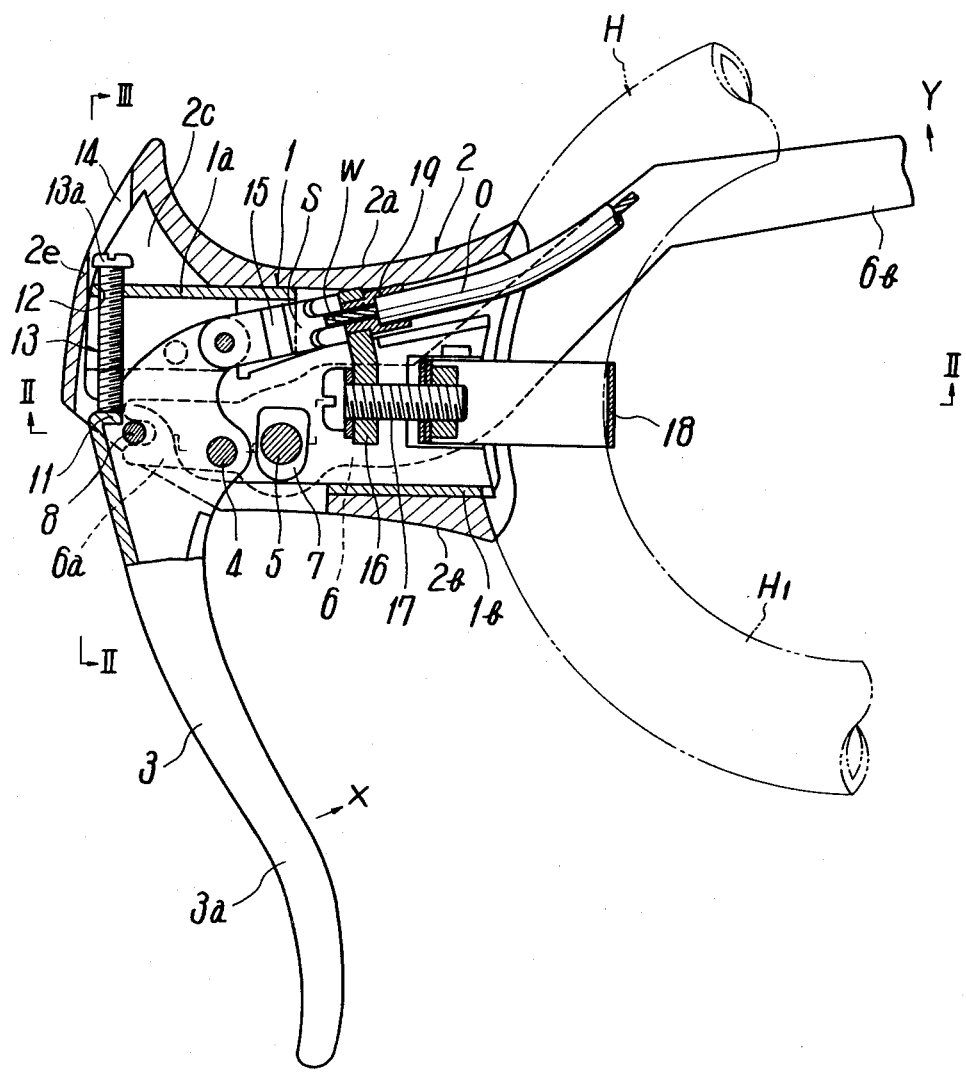
FIG. 1 is a longitudinal sectional view of a typical embodiment of an operating device of the invention.

Referring to the drawing, reference numeral 1 designates a bracket member fixed to a bent portion $H_1$ at a drop handlebar H comprising U-like shaped bent portions $H_1$ and a straight portion (not shown), and 2 designates a grip-like shaped cover covering the bracket member 1. The bracket member 1 comprises a front wall 1a, a rear wall 1b, and a pair of first and second side walls 1c and 1d. A first lever 3 extending along the bent portion $H_1$ is pivoted between the side walls 1c and 1d of the bracket member through a first lever shaft 4. A second lever shaft 5 is journalled to the side walls 1c and 1d and projects at one end from the side wall 1c, and a second lever 6 extending along the straight portion of the handle bar is pivoted to the projecting end of lever shaft 5 through a bush 7 and extends 6a at the pivoted end sidewise of the first lever 3 so that a forked end of the extension 6a engages with a shaft 8 fixed to the first lever 3, thereby being operable therethrough in association with the first lever 3.

The cover 2 is formed of a soft material, such as rubber or soft synthetic resin, has a shape which is easy to grip, and comprises a front wall 2a, a rear wall 2b, first and second side walls 2c and 2d, and an upper wall 2e to thereby cover the front wall 1a, rear wall 1b and first and second side walls 1c and 1d of bracket member 1 respectively so as not to carelessly escape therefrom. The cover 2 is provided at the first side wall 2c at the second lever 6 side with an elongate slot 2f corresponding to a path of swinging motion of the second lever 6, so that a grip 6b thereof projects outwardly from the cover 2 through the slot 2f.

The embodiment of the operating device of the invention shown in FIGS. 1 through 6 is provided at the bracket member 1 with supports 9 and 10, which are formed at both sides in the swinging direction of the second lever 6, project from the first side wall 1c at the second lever 6 side outwardly thicknesswise of the second lever 6, and each have a height larger than a thickness thereof. The first side wall 2c of cover 2 is received by the supports 9 and 10 to form a given gap between the inner surface of the first side wall 2c and the outer surface of the second lever 6, the gap preventing the cover 2 from press-contacting at the inner surface with the second lever 6, thus adding no resistance against swinging motion of the second lever 6.

The first and second supports 9 and 10, as shown in FIGS. 5 and 6, are integral with the bracket member 1, the first support 9 comprising a rising wall 9a perpendicular from the first side wall 1c and a support wall 9b extending from the rising wall 9a in parallel to the first side wall 1c and in continuation of the front wall 1a, the second support 10 extending from the rear wall 1b of bracket member 1. In this instance, the supports 9 and 10 are easy to machine because the bracket member 1 usually is formed of a metallic plate.

The first support 9 is disposed at the front wall 1a side of the bracket member and the second support 10 at the rear wall 1b side, both the supports 9 and 10 having therebetween the pivoted portion of second lever 6, so that the support 9 is positioned at the outside of the second lever pivoted portion with respect to the drop handlebar H, that is, away therefrom, and the support 10 is positioned at the inside of the same, that is, toward the drop handlebar H. Also, the support wall 9b is made larger in width.

With the above described construction, a gripping force produced by a cyclist steering the bicycle while gripping the bracket member 1 through the cover 2, can be born reliably by the first support 9 at the front wall 1a side, on which the gripping force acts to a great extent. Also, a cyclist can grip the cover 2 with a comfortable touch.

Figure 7:
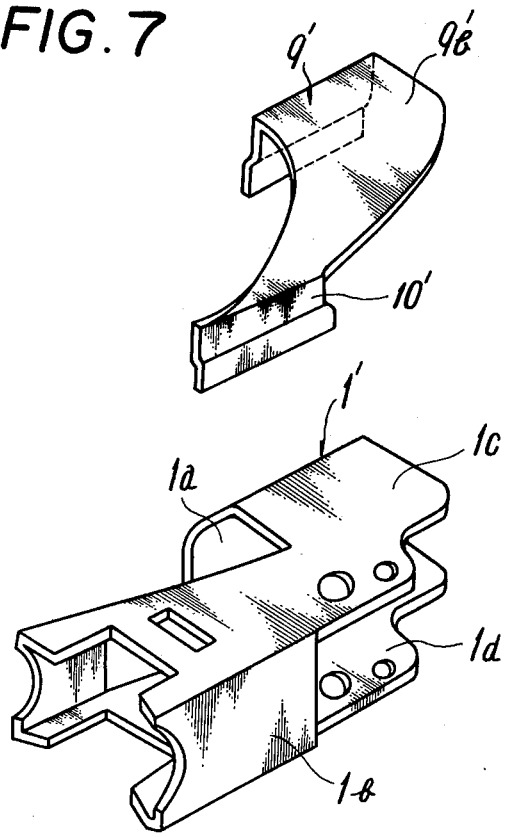
FIG. 7 is a perspective exploded view of a bracket member of a modified embodiment.
Figure 8:
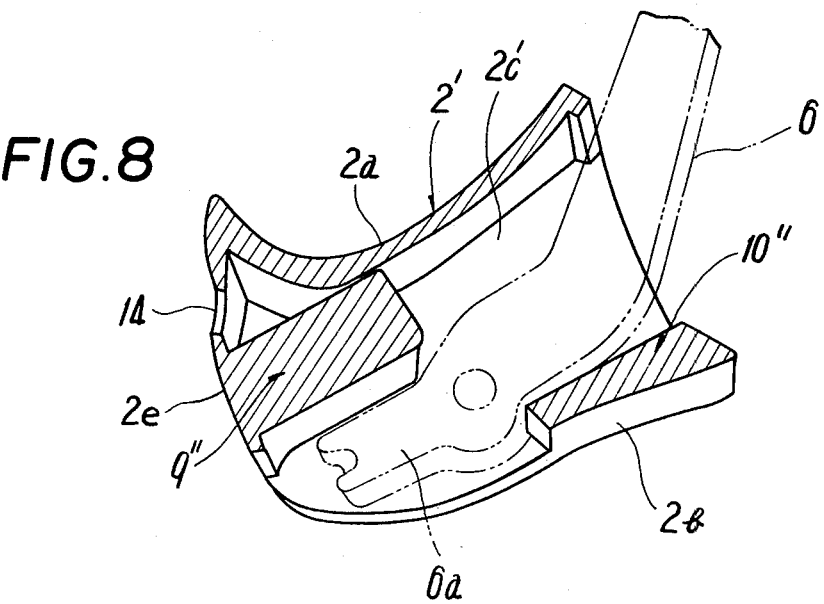
FIG. 8 is a perspective sectional view of a cover in another modified embodiment.

Alternatively, the supports 9' and 10' may, as shown in FIG. 7, be separate from the bracket member 1' and formed of, e.g., synthetic resin, so as to be mounted on the bracket member 1', or cover 2, or may, as shown in FIG. 8, be integral with the cover 2'. In the latter case, it is necessary to avoid contact of the first side wall 2c' at the cover 2' with the second lever 6 when the cover 2' is gripped to bend the supports 9' and 10'. The supports 9' and 10', when separate from the bracket member 1, are preferably integral with each other as shown in FIG. 7.

Figure 2:
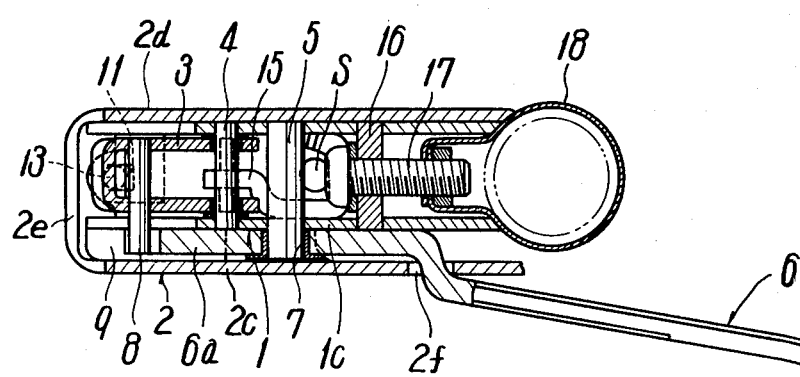
FIG. 2 is a sectional view taken on the line II—II in FIG. 1.
Figure 3:
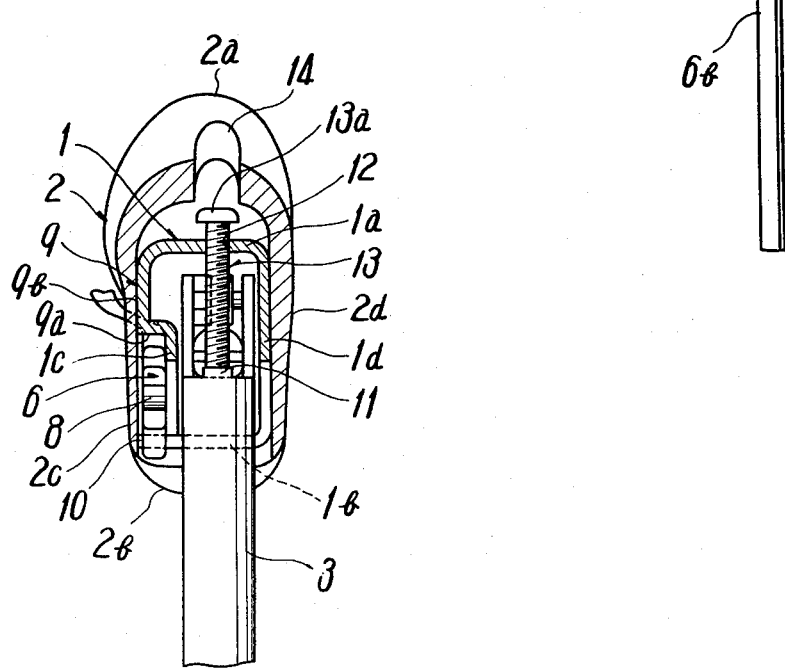
FIG. 3 is a sectional view taken on the line III—III in FIG. 1.

Referring to FIGS. 1 through 3, the first lever 3 has at its pivoted end a stopper 11, and the bracket member 1 is provided at the front wall 1a with a threaded bore 12, which screwably engages with an adjuster 13 having at its head a control element 13a and abutting at the tip against the stopper 11, thereby adjusting the return positions of the first and second levers 3 and 6. The cover 2 has a through bore 14 at a portion opposite to the threaded bore 12, so that the adjuster 13 is rotatably adjustable from the outside of cover 2 through the bore 14.

The bush 7 is tubular and has an unround cross section, and has an eccentric shaft bore fitted onto the second lever shaft 5 and a flange at one lengthwise end, so that the second lever 6 may have its pivot position changed by exchanging the bush for another one having a different shaft bore position.

The first lever 3 extends from its pivoted end toward the front wall 1a and pivotally supports at the utmost end a holder 15 for an end piece S of a control wire W.

In addition, in FIGS. 1 and 2, reference numeral 16 is a flat adapter supported between the first and second side walls 1c and 1d of bracket member 1. The adapter 16 carries a band member 18 through a mounting bolt 17, the band member 18 is fitted onto the bent portion $H_1$ and the bolt 17 is screwably tightened to fix the bracket member 1 to the bent portion $H_1$. A stop 19 for an outer sheath O guiding the control wire W is mounted on the adapter 16, thereby bringing the wire W and outer sheath O into the bracket member 1.

When the cyclist, while gripping the cover 2 for steering the bicycle, operates the levers for the brake action, he grasps the end portion 3a of the first lever 3 by the fingers of his hand which is gripping the cover 2 and turns the first lever 3 in the direction of the arrow X in FIG. 1, thereby pulling the control wire W to actuate the brake. In this instance, the first side wall 2c of cover 2 is surely prevented from press-contact with the second lever 6 due to the fact that the supports 9 and 10 form a given gap between the inner surface of the first side wall 2c of cover 2 and the second lever 6, and are disposed at both sides in the swinging direction of the second lever 6 so that the gripping force for the cover 2 by the cyclist's hand is transmitted to the bracket member 1 through the supports 9 and 10. As a result, the second lever 6 always operates with a light touch.

As seen from the above, the operating device of the invention, which has a gap between the cover 2 and second lever 6 formed by the supports and can apply the cyclist's gripping force to the bracket member through the supports, prevents press-contact of the cover with the second lever, so that the cyclist can operate the lever with a light touch while gripping the cover covering the bracket member. Furthermore, he can operate the lever without an uncomfortable touch because the motion of the second lever is not transmitted to his hand through the cover.

As many apparently different embodiments of this invention may be made without departing from the spirit and scope thereof, it is to be understood that the invention is not limited to the specific described embodiments thereof, but only as defined in the appended claims.

What is claimed is:

1. An operating device for a bicycle, which is mounted on a drop handlebar thereof having a straight portion and bent portions, said device comprising;
    a bracket member having a front wall, a rear wall, and first and second side walls and mounted on said bent portion;
    a first lever pivoted at the inside of said bracket member and extending along said bent portion;
    a second lever pivoted at the outer surface of said first side wall at said bracket member, extending along said straight portion, and having a connecting means for connecting said second lever with said first lever;

a grip-like shaped cover covering said bracket member and the pivoted bases of said first and second levers pivoted to said bracket member; and first and second supports interposed between the outer surface of said first side wall at said bracket member and the inner surface of said cover opposite to the outer surface of said first side wall, each having a height larger than a thickness of said second lever, and being disposed at both sides in the swinging direction of said second lever.

2. An operating device for a bicycle according to claim 1, wherein said first and second supports are integral with said bracket member.

3. An operating device for a bicycle according to claim 2, wherein said first support comprises a rising wall rising from said first side wall at said bracket member and a support wall connecting said rising wall and front wall and extending in parallel to said first side wall.

4. An operating device for a bicycle according to claim 2, wherein said second support is formed as an extension of the rear wall at said bracket member.

5. An operating device for a bicycle according to claim 1, wherein said first and second supports are disposed at both sides in the swinging direction of said second lever, and positioned, such that the pivoted portion of said second lever resides between said first and second supports.

6. An operating device for a bicycle according to claim 5, wherein said first support has a support wall larger in width and parallel to the first side wall at said bracket member pivotally supporting said second lever, said first support being disposed at the front wall side of said bracket member and at the outside of the pivoted portion of said second lever.

7. An operating device for a bicycle according to claim 1, wherein said first and second supports are separate from said bracket member and fixed thereto by a fixing means.

8. An operating device for a bicycle according to claim 1, wherein said first and second supports are separate from said bracket member and fixed to said cover by a fixing means.

9. An operating device for a bicycle according to claim 1, wherein said first and second supports are integral with said cover.

* * * * *